United States Patent [19]

Wood

[11] Patent Number: 4,859,346
[45] Date of Patent: Aug. 22, 1989

[54] GROUND MOUNTED TRACTION DRIVE AND METHOD FOR SEDIMENTATION DEVICE

[75] Inventor: Leonard J. A. Wood, Pennant Hills, Australia

[73] Assignee: Bakers Hughes Inc., Houston, Tex.

[21] Appl. No.: 208,308

[22] Filed: Jun. 17, 1988

[51] Int. Cl.[4] ............................................. B01D 21/06
[52] U.S. Cl. .................................... 210/776; 210/803; 210/528; 210/530; 210/531; 210/525; 210/241
[58] Field of Search ............... 210/523, 524, 525, 528, 210/530, 531, 776, 800, 803, 241; 52/690

[56] References Cited

U.S. PATENT DOCUMENTS

| | | | |
|---|---|---|---|
| 2,068,428 | 1/1937 | Morehead | 210/530 |
| 2,267,516 | 12/1941 | Adams | 210/530 |
| 2,289,112 | 7/1942 | Fischer | 210/530 |
| 2,566,988 | 9/1951 | Kolb | 210/531 |
| 2,838,180 | 6/1958 | Lawlor | 210/528 |
| 3,959,152 | 5/1976 | Seifert et al. | 210/530 |
| 4,022,697 | 5/1977 | Pankuch | 210/530 |
| 4,751,002 | 6/1988 | King | 210/530 |

FOREIGN PATENT DOCUMENTS 446010 1/1948 Canada ................... 210/530

Primary Examiner—Richard V. Fisher
Assistant Examiner—Cynthia L. Nessler
Attorney, Agent, or Firm—Skjerven, Morrill, MacPherson, Franklin & Friel

[57] ABSTRACT

A peripheral traction unit for a thickener is ground-mounted on a circular support base, normally of concrete, extending circularly at ground level below and exterior of the vertical walls of an above-ground thickener tank. A continuous rail and rack are mounted on a sole plate and integral key embedded and grouted in a support base pocket. A wheel and pinion assembly is provided on a traction frame so that the wheel rolls on the rail and the pinion meshes with the rack. The bottom of a box beam is pin-connected to the traction frame and the top of the box beam is fixedly connected to a rake-driving rotatable truss extending radially or diametrically across and above the tank wall. All erection, adjustment and maintenance of the traction unit is done at ground level rather than at the elevation of the upper edge of the tank wall where heretofore peripheral drive units have been positioned.

12 Claims, 5 Drawing Sheets

GROUND MOUNTED TRACTION DRIVE AND METHOD FOR SEDIMENTATION DEVICE

RELATED APPLICATION

This application relates to U.S. application Ser. No. 07/008,520, filed 01/29/87, now U.S. Pat. No. 4,751,002, on an application of Donald L. King and assigned to an affiliated company of Applicants' assignee, the disclosure of which is incorporated herein by reference.

FIELD OF THE INVENTION

This invention relates to a liquid-solids separation traction drive for a sedimentation device which thickens, clarifies, or separates suspended material from a liquid in a slurry. More particularly, the invention is directed to a traction drive connected to a rake-moving rotatable truss extending across the thickener tank.

STATE OF THE ART

Many metallurgical, wastewater and other treatment techniques utilize sedimentation devices, hereinafter generally called thickeners, to separate suspended solids from the liquid of a solids-liquid slurry. Thickeners generally include a large circular slurry-holding tank with steel or concrete walls and a tank bottom, equipped with a raking structure which rotates slowly about a central support column to move settled solids to a discharge sump formed adjacent to a central portion of the tank bottom. The raking structure comprising one or more rake arms is usually driven by a gear mechanism and motor mounted on a central pier (center drive type) or by a traction unit which travels about the top periphery of the tank wall (peripheral or traction drive type). The present invention is directed to an improvement to the latter type of drive.

Peripheral drives are mounted on the upper edge of the thickener wall and may merely comprise a driven wheel which is attached to a truss and rake structure. The wheel rides on the upper edge of the tank wall and is driven by gearing and an electric motor. Such a construction is exemplified by U.S Pat. Nos. 2,267,516, 2,289,112, 3,959,152 and 4,022,697. Other motive means have been utilized for driving a traction-wheel including a circular rack and circular rail, both mounted concentrically on the upper edge of a thickener tank wall. A pinion is provided side-by-side with the traction wheel so that a drive motor can rotate an axle and attached pinion which pinion meshes with and moves around the circular rack. The wheel then rolls on the wall upper edge or on a rail mounted on the wall upper edge. Commercial installations utilizing the foregoing have been constructed Such installations have necessitated concrete tank walls of relatively large thickness to both function as the tank wall itself and to have an upper edge of sufficient width to accommodate both the rail structure and the rack structure and to support the weight of truss. Generally, the commercial designs also utilize a concrete poured overflow launder which adds further thickness to the tank walls If an installation is to incorporate a peripheral gear drive with pinion, the overall tank wall thickness is ordinarily doubled and requires additional in-ground concrete footings below the tank walls. Conventional constructions have incorporated a steel tank wall and a steel tank floor, particularly if the tank contents, e.g. a caustic liquid, would be detrimental to the concrete wall, which wall is mounted internally of a thick parallel outer concrete circular wall supporting the rail, rack, tractor, and rotatable truss.

U.S Pat. No. 2,068,428 shows in FIG. 2 a peripheral traction drive for a settling tank where the traction wheel is driven by a gear rack on the inner periphery of the concrete wall adjacent the top and the wheel rides on a circular rail on the upper edge of tank wall. The entire tank is apparently buried below ground.

In the related application, a traction-driven truss extends over the top of a tank wall and supports and pulls a series of rake arms by support and torque cables connected to the truss. The traction wheel rides on the upper edge of the tank wall.

SUMMARY OF THE INVENTION

As can be seen in the prior art discussed above, traction drives necessitate large (wide and high) concrete structures to support the rail, the rack, truss and rake elements of the overall traction-type thickener at the upper edge of the tank wall. Construction costs of the tank walls are high due to the large wall structures involved. Further, erection, assembly, adjustment, and maintenance costs of the traction drive elements are high due to the necessity of workers working at high above-ground levels on scaffoldings or hoists with resultant safety considerations and the difficulty, cost, and time of lifting each element into place for assembly.

The present invention solves each of the above problems by providing a traction unit, including motor(s), a rail, pinions, wheels and racks which are essentially mounted at ground level with a simple box beam or other arch structure extending from the traction unit up to an end of the rake truss extending outwardly from above the upper edge of the vertical tank wall. A simple circular support base, normally concrete, extends coaxially around the tank at ground level and may also extend under the tank wall and part of the tank floor acting as a support footing for the tank. The rail and rack are fixedly mounted on the support base The traction unit wheels and pinions are mounted on the rail and rack. A box beam, connected to and depending from the truss end, is pin-connected to the traction unit. By reason of this construction, all erection of the tractor drive means, other than the fixed attachment of the box beam to the truss, is accomplished at ground level.

The circular support base is of a height in a typical installation, only about 1/5 or less of the height of the prior art rail and rack-supporting tank wall itself. Not only are large amounts of concrete saved, but construction cost are substantially diminished by a relatively shallow support base being provided in a relatively-shallow circular ditch in the ground surface or by having the support base on the ground level.

DETAILED DESCRIPTION

Figure 1:
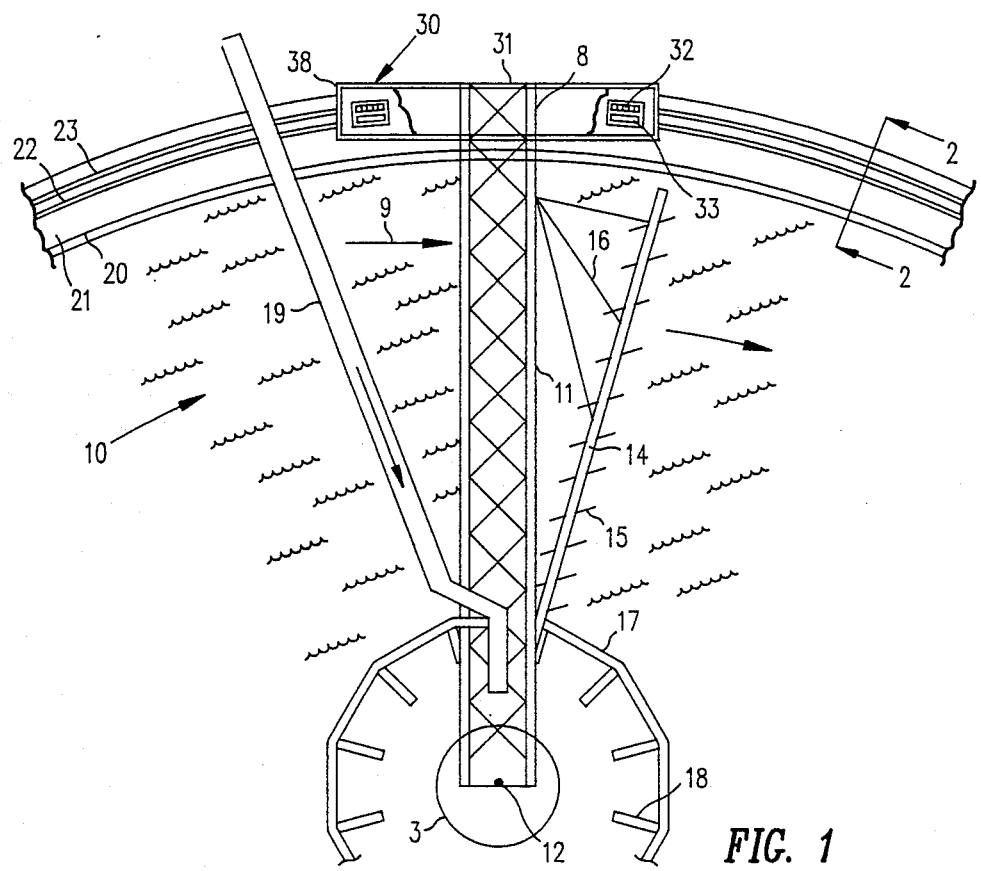
FIG. 1 is a schematic plan view of a portion of a circular thickener incorporating the present invention.

In FIG. 1, a circular thickener 10 is partially shown including a truss 11 which extends outwardly of a tank 20 and radially inwardly to a center point 12 within the tank on which the truss may be pivoted It is to be understood that truss 11 may extend diametrically across the circular tank and other trusses may extend partially outward from the centerpoint to support other rake assemblies from the respective trusses as shown in the related application. The typical rake assembly 14 has elongated rake arms and rake blades 15 extending from the bottom thereof. The rakes are positioned so that they sweep the bottom of the tank and move solids to a discharge sump (not shown) at the center of the tank. As shown in the related application, a series of cables 16 extending from the rake arm to the truss may support the rake arm at its tank bottom position The cables 16 act also as torque cables to pull the rake structure around the bottom of the tank. A center feedwell 17 is typically provided having entrance baffles 18 which receive slurry to be separated, to be thickened, or to be clarified through stationary feed pipe 19 which extends over the upper edge of the tank wall and over the truss with sufficient clearance to allow passage of the truss thereunder The feed pipe may be supported by a stationary access bridge (not shown) which spans from the tank center to outside the tank diameter and which is positioned and spaced above the rotating truss. Alternatively, the feed pipe may be positioned to come under the tank and up through a central column or caisson 3 exiting at the feed well.

Movement of the truss and the rake(s) in the direction indicated by arrow 9 is provided by a traction unit 30 which is attached to an end 8 of the truss which extends radially exteriorly of the tank 20. The traction unit includes a traction frame 31, a pair of traction wheels 33, and a pair of pinions 32. There may be two bogies, one on each end of the frame Each bogie, in a preferred embodiment, has two pairs of wheels and two pairs of pinions rotatable in the frame 31. Only one wheel and one pinion are seen in FIG. 1 on each bogie. A box beam 38 connects the traction frame to the end 8 of truss 11. The traction wheels 33 ride on an inner circular rail 22 and outer pinions 32 mesh with an outer rack 23 generally concentric with rail 22. Circular rail as used herein means either a discrete metal rail or a dedicated portion of support base 21. The rail and rack are mounted on a ground-level support base 21 which has a major portion extending laterally outward of the tank 20 and a minor portion which may extend under the peripheral edge of the tank to support the tank wall and a portion of the tank bottom The latter is seen more specifically in FIG. 2. A motive force is provided to the traction unit 30 which then propels the truss 11 and its attached rake arm 14 around the periphery of tank 20. A pair of traction units may be employed in the event that truss 11 extends diametrically across the entire tank with the second traction unit at a position 180° from the shown traction unit 30.

Figure 2:
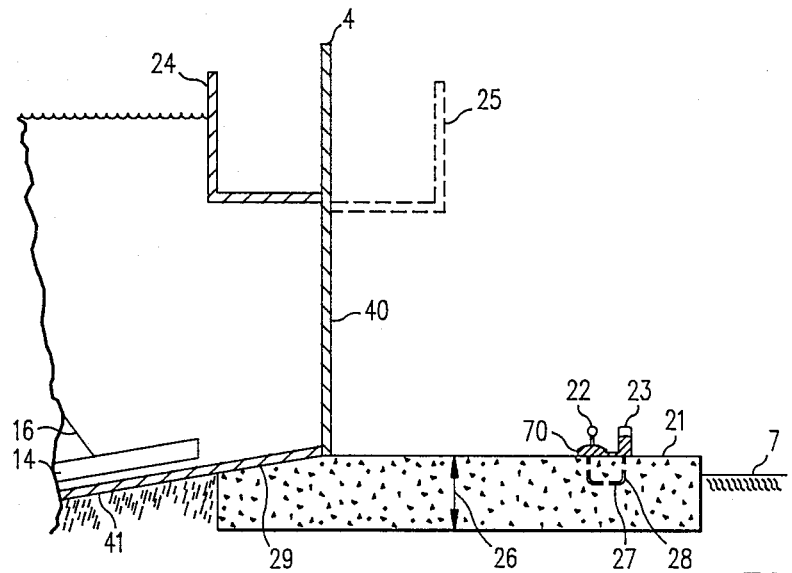
FIG. 2 is a schematic cross-sectional view of the above-the-ground tank and ground level support base taken on the line 2—2 of FIG. 1.

The invention is most clearly seen in FIG. 2 where support base 21 is shown in position immediately adjacent to or at ground-level 7. Rail 22 is mounted on the top surface of support base 21 with rack 23 positioned concentric thereto Both the rail and a series of rack segments are mounted on a sole plate 70 shown in detail in FIGS. 9 and 10 Depending from the sole plate is a key 28 which is grouted in a cylindrical or oblong-shaped pocket 27 extending in the support base 21.

The tank 20 includes a vertical tank wall 40 having an upper edge 4 and a tank bottom 41 normally of inverted conical shape so that the settled solids will pass down the inner incline of the inverted cone to a central sump. A portion 29 of the support base 21 has a conical surface which matches the incline of the tank bottom and functions to support both the tank wall 40 and the peripheral edge of the tank bottom 41. It is contemplated that separate footings may be employed to support the tank and a separate support base may be employed to mount the rail and rack segments and to support the truss and rake structure. All concrete can be poured and completed prior to erection of the tank and truss and traction mechanism. Further with the present design, any metal tank wall leakage can be detected more easily than in prior constructions where the metal tank liner was flush with the vertical wall mounting the traction unit.

Also shown in FIG. 2 is a circular launder 24 extending on the inside of tank wall 40 for receiving clarified liquid over its inner weir. In an alternative configuration, the launder 25 may be present on the exterior of the tank with the tank wall upper edge 4 lower than the top of trough 25. There is sufficient lateral clearance between the tank wall 40 (or trough 25) and the box beam 38 (not shown in FIG. 2) so as to allow the erection of the traction unit and box beam exteriorly of the tank to support the extended end 8 of truss 11 on the rail and rack structures mounted on the ground-level support base 21.

Figure 3:
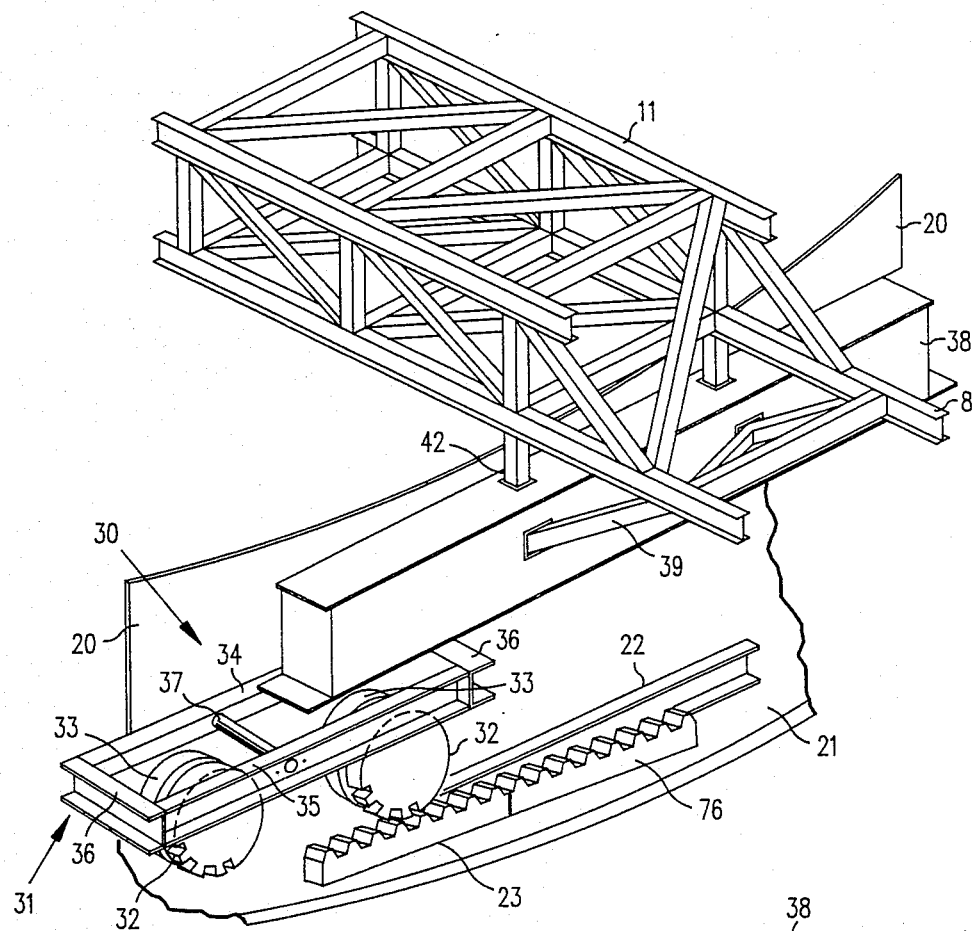
FIG. 3 is a isomeric partial exploded schematic view of the invention showing the truss connection to the traction unit.

FIG. 3 illustrates more clearly the connection of the wheels to the driven truss. Truss 11 has an extended end 8 which is connected by suitable struts 39 and 42 to the sides and top of box beam 38. Box beam 38 in turn is connected by a suitable pin arrangement (FIG. 4) to the frame 31 of traction unit 30. Pin 37 extends across longitudinal members 34 and 35 of the traction frame 31. These longitudinal members are connected by cross pieces 36. Traction wheels 33 are mounted on the frame by a suitable axle structure (FIG. 8) along with pinions 32 which ride in the rack 23. The rack 23 is made of a number of straight rack sections 76. A typical rack segment may be 1010 mm long and 74 mm wide and 182.6 mm deep (to the top of the teeth) Each typical rack has 9 teeth. Since the rack segments are modular individual items, the number of rack segments can be adjusted to suit the thickener diameter. The only change required for a differing diameter is a sole plate which will have the correct mounting angle between adjacent rack segments For example, in a 90 meter (diameter) thickener where the radius to the rack centerline at the center of the rack is approximately 46,332 mm, the number of rack segments would be 286. In an 80 meter thickener having a radius of 41,308 mm to the center of the rack, the number of rack segments would be 255. Likewise in a 70 meter thickener, the radius to the rack centerline at the center of the rack would be approximately 36,285 mm and the number of rack segments would be 244. For the diameters quoted, the tooth variations required in the rack for each diameter is less than the casting tolerance. Therefore, each rack segment is useful for at least these three diameters of thickeners.

Figure 4:
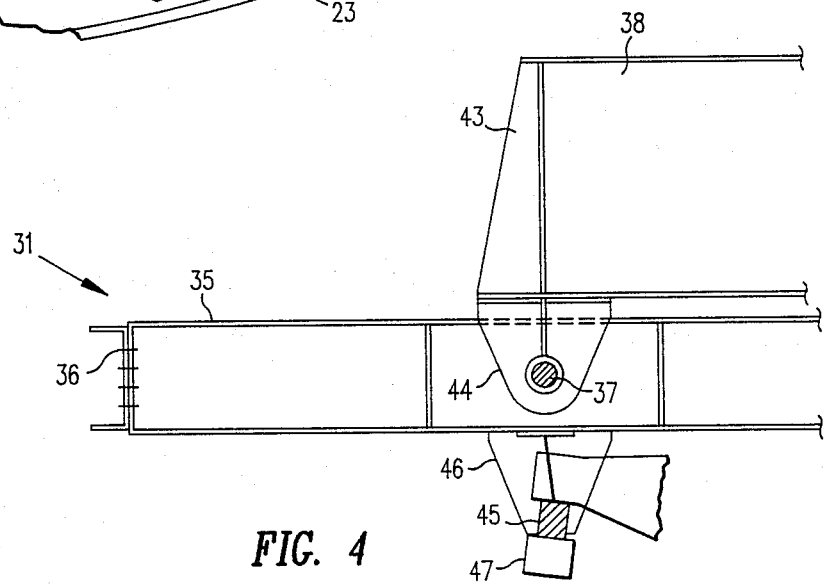
FIG. 4 is an elevation view of the tractor unit to box beam mounting connection.

FIG. 4 indicates the attachment of the wheel to the box beam "arch work" which connects the traction unit 30 to the truss. Each of the tractor frames comprise two main longitudinal steel beams 34, 35 joined by steel cross members on top of two axle assemblies. Midway between both the axles, a horizontal pin 37 is inserted in the tractor frame at 90° to the frame centerline. The horizontal pin 37 on each tractor also engages a bracket 44 mounted to the underside of and adjacent to an end of the box beam 38. The pin transfers all tractor forces from its particular tractor into the box beam "arch work" and also allows the tractor frame to rotate in a vertical plane to keep each wheel in contact with the rail head. Element 43 is a stiffening plate at the end of box beam 38. Element 45 is a bar square in cross section supported by plate 46 and welded to beams 34, 35 upon which react the ends of hydraulic motor torque arms 47. Arms 47 are attached to hydraulic motors 50.

Figure 5:
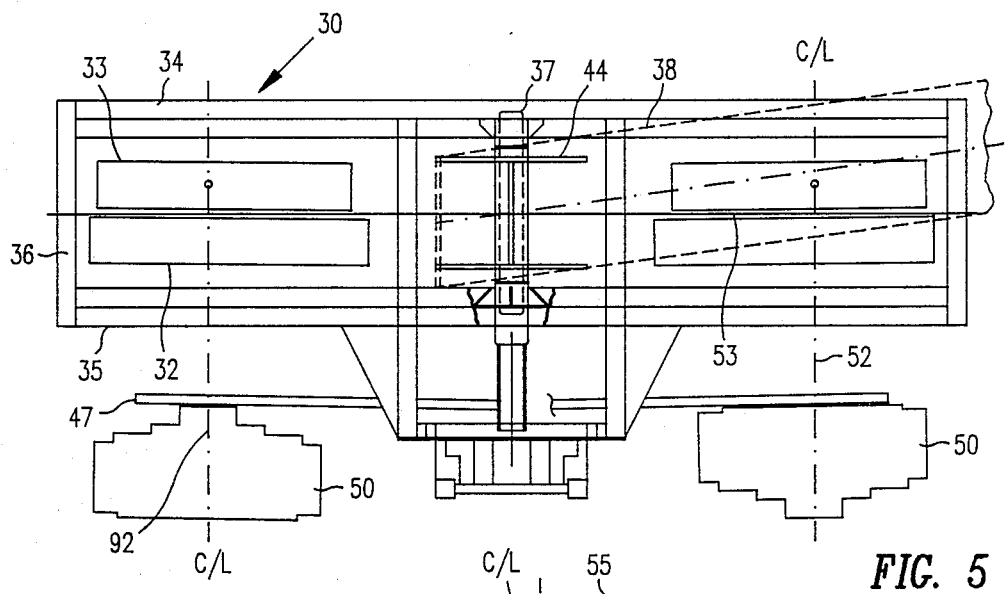
FIG. 5 is a plan view of the traction unit without axles, showing in phantom, the box beam extending thereover.

FIG. 5 is a plan view of the traction unit 30 which illustrates the positioning of the box beam 38 over the traction unit A bracket 44 descends from the box beam and is connected by pin 37 to the side beams 34, 35 of the traction frame by suitable bolts. The centerlines of the pin connection and the centerline 52, 92 of the axles for the pairs of traction wheels 33 and drive pinions 32 are radial inside the tank and all intersect at the true center of the tank. A hydraulic motor 50 is connected to axle 61 and has a hydraulic motor torque arm 47 extending therefrom which reacts against bar 45. The hydraulic motor 50 rotates and so rotates axle 61 to drive the pinions and move the traction unit along the rail and rack.

Figure 7:
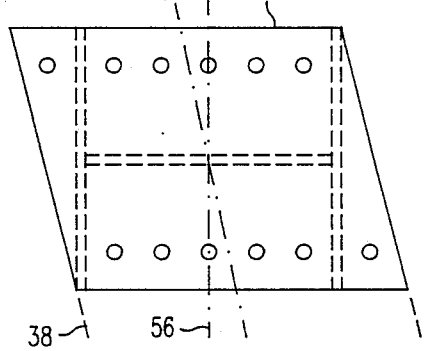
FIG. 7 is a plan view of the pin bracket mounting flange.
Figure 6:
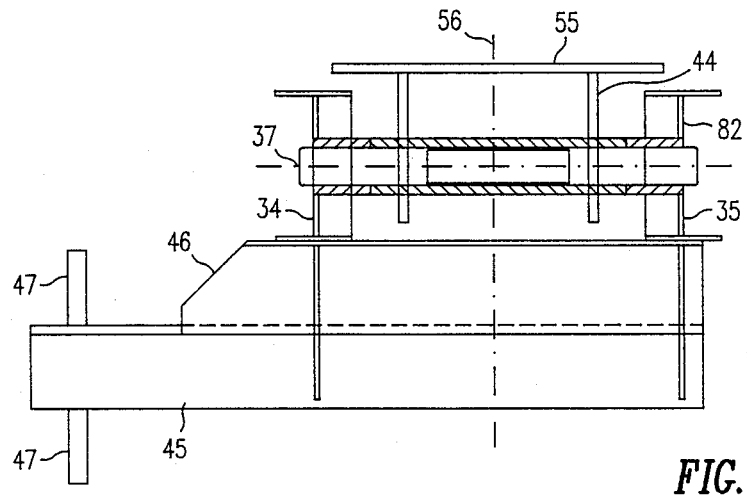
FIG. 6 is a plan view partially in section of the connection between the box beam bracket and the traction frame.

As seen in FIGS. 6 and 7, a pin bracket mounting flange 55 is provided with a pin bracket 44 depending therefrom. The pin bracket is apertured to receive pin 37 pin bushings 82 are attached to longitudinal steel beams 34, 35 and also receive the outer ends of pin 37. The pin bracket mounting flange 55 is attached to the underside of and at each end of the beam as can be seen schematically.

Figure 8:
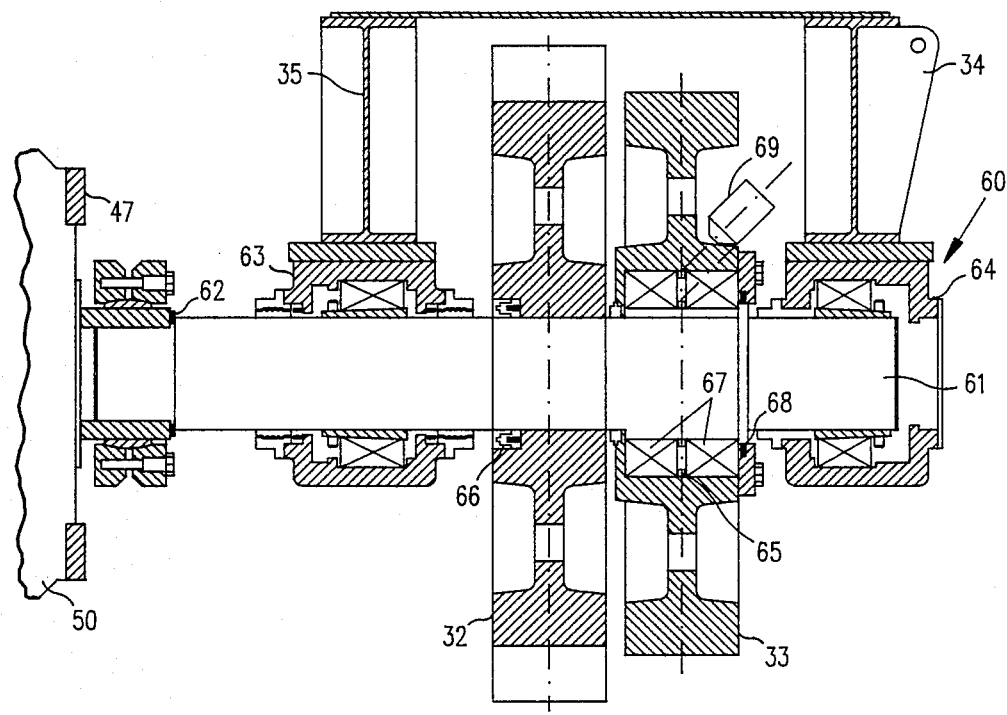
FIG. 8 is a cross-sectional view of the wheel and pinion drive connection in the traction unit.

FIG. 8 shows the detailed construction of the drive axle(s) generally shown at 60. The axle 61 is connected by a coupling 62 to a hydraulic drive motor 50. The hydraulic motor 50 reacts against the traction unit (bogie) frame bracket 45 by means of the torque arm 47 and thereby rotates axle 61. The hydraulic drive motor may be a Marthon model manufactured by Hagglund-Denison conventionally used for low speed, high torque drives. Axle 61 is supported by axle bearings 63 and 64 which are fixedly held on the underside of frame rails 35 and 34 of the tractor frame. Pinion 32 is keyed to the shaft by an expansion ring assembly 66 so that it rotates with the axle and mesh the pinion teeth in seriatim with the teeth of the rack fixed on the support base. Wheel 33 is free to rotate on axle 61 by means of bearings 67 surrounding the axle in the wheel hub and the peripheral edge of the wheel is mounted on and rolls on the rail 22 on the support base. A grease lubricator 69 accesses bearings 67. A spacer 65 acts to space the pair of bearings 67. Translationary motion of the wheel along the longitudinal axis of the axle 61 is prevented by a retainer ring 68 bolted into the wheel hub and having a shoulder on axle 61 retaining and sealing the bearings.

Figure 9:
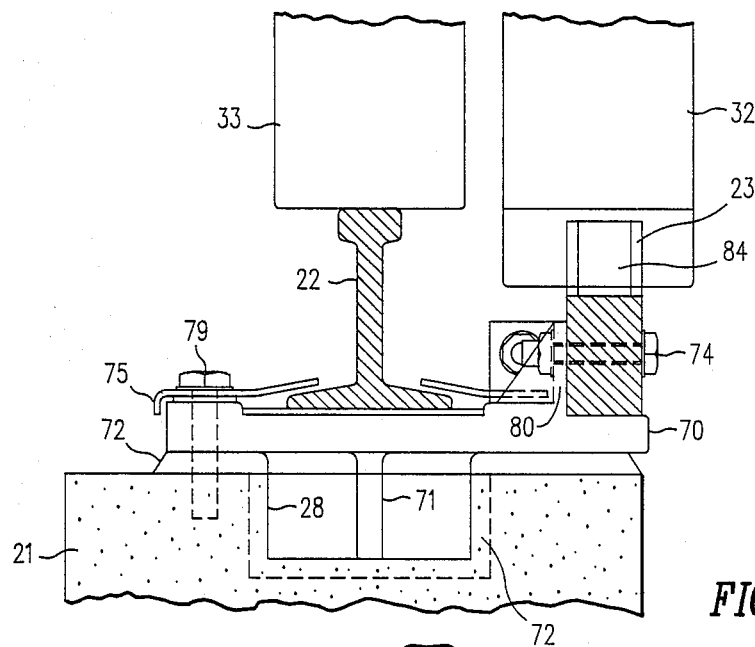
FIG. 9 is an elevation view partially in cross section showing the mounting of the rail and rack segments on a sole plate embedded into the support base.
Figure 10:
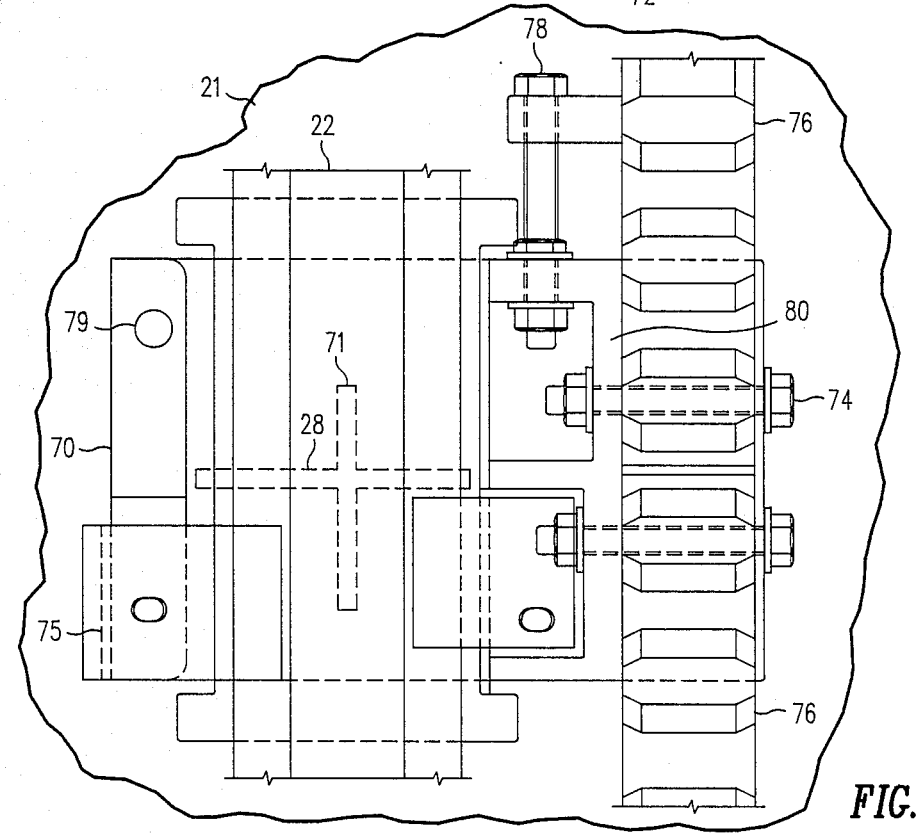
FIG. 10 is a plan view of the mounting of the rail and rack segments on the support base.

FIG. 9 shows the construction of sole plate 70. A depending shear key 71 is provided integral with the sole plate. As seen in FIG. 10 the key has a cruciform shape with a section 71 parallel to the centerline of the rail and a cross piece 28, both of which are anchored by appropriate grout in a rectangular, oblong or circular pocket in the concrete support base 21. Grout 72 is provided under the sole plate and around the shear key. Rail 22 is held on the sole plate by a series of clamping members 75 and bolts 79. Bolts 79 also firmly attach sole plate 70 to the concrete support base 21. Sole plate 70 includes an upwardly directed flange 80 onto which the rack segments 23 are attached by nut and bolt connectors 74. Drive pinion 32, more particularly the pinion teeth 84, intersect with the teeth of the rack segments 76 in seriatim as the tractor proceeds around the periphery of the tank.

As seen in FIG. 10, each of the rack segments 76 are held by bolts 74 on sole flange 80. A rack adjustment bolt 78 may be provided to adjust the angularity of the rack segment relative to adjacent segments. Bolt 78 also transmits traction forces from the rack to the sole plate.

Figure 11:
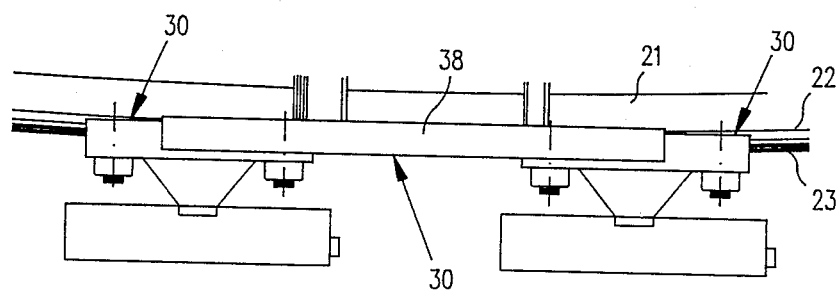
FIG. 11 is a plan view of the preferred form of the tractor bogie with pairs of wheels and pinions.

FIG. 11 illustrates the preferred form of the invention in which a pair of bogies are mounted each at an end of box beam 38 and wherein pairs of wheels and pairs of pinions in each bogie ride of the circular rail 22 and circular rack 23, respectively.

The wheel diameter in a typical installation will be nominally approximately 1080 mm with a wheel width of 200 mm. Wheels are normally made of alloy steel 4340 grade, quenched tempered, to give 321-363 BHN (Brinell Hardness Number) on the tread surfaces. All tractor forces between the concrete base and the sole plate are transferred by means of the shear key cast into the underside of the sole plate Typically, the circular support base 21 will be about 3000 mm wide and 600 mm deep for a 70-90 meter thickener.

The above description of the preferred embodiment of this invention is intended to be illustrative and not limiting Other embodiments of this invention will be obvious to those skilled in the art in view of the above disclosure.

We claim:

1. A liquid-solids separation traction drive thickener comprising:
   a thickener tank having a substantially vertical cylindrical tank wall and a circular tank floor, said tank wall extending upward essentially from ground level;
   a circular support base adjacently positioned at ground level exteriorly surrounding said tank wall and extending outwardly from a bottom position of said tank wall;
   a rotatable driven truss extending radially inward of said cylindrical wall and spaced above and extending laterally from a top edge of said tank wall;
   at least one rake arm in said tank, said at least one rake arm being rotatively driven by rotation of said truss; and means positioned exteriorly of said tank for rotatively driving said truss around said tank, said means including a circular rail on said support base and a traction frame extending above said ground level and below said tank wall top edge and supporting at least one wheel riding on said rail;

and a structural member spaced exteriorly from said tank wall and connected to said traction frame and extending upwardly to support an end of said truss extending outwardly from said tank wall, such that erection and maintenance of said rail and said traction frame is essentially accomplished at ground level.

2. The thickener of claim 1 in which an inner peripheral section of said support base supports the bottom edge of said tank wall and an outer peripheral edge of said tank floor.

3. The thickener of claim 2 in which said support base is a concrete base and said tank wall and tank bottom are constructed of steel plate.

4. The thickener of claim 3 in which said tank floor is of inverted cone-shape and said support base includes a conical section supporting said outer peripheral edge of said tank floor.

5. The thickener of claim 1 in which said structural member comprises a box beam, said truss being connected to said box beam and said box beam being pin connected to said traction frame.

6. The thickener of claim 1 wherein said means for rotatively driving said truss further includes a circular drive rack on said support base, and at least one pinion engageable with said drive rack, and wherein said at least one wheel and said at least one pinion are axle-connected to said traction frame and wherein center lines of said pin connection and said axle-connection extend radially inside the tank and intersect at the center of said tank.

7. The thickener of claim 1 including a series of sole plates circularly extending around said tank and mounting said rail, said sole plates including a downwardly extending key, and wherein said support base includes a pocket in a top surface for reception of and for holding said key.

8. The thickener of claim 1 including a generally circular drive rack connected to said support base, said drive rack comprising a series of elongated straight rack segments mounted end-to-end on said support base, and wherein the number of rack segments is dependent on the diameter of said thickener tank and said support base.

9. A liquid-solids separation traction drive thickener comprising:

a thickener tank having a substantially vertical cylindrical tank wall and a circular tank floor, said tank wall extending upward essentially from ground level;

a circular support base at ground level surrounding said tank wall and extending outwardly from a bottom position of said tank wall;

a rotatable driven truss extending radially inward of said cylindrical wall and spaced above and extending laterally from a top edge of said tank wall;

at least one rake arm in said tank, said at least one rake arm being rotatively driven by rotation of said truss; and means for rotatively driving said truss around said tank, including a circular rail on said support base, a traction frame supporting at least one wheel ridable on said rail;

a structural member spaced from said tank wall and connected to said traction frame and extending upwardly to support an end of said truss extending outwardly from said tank wall, such thaterection and maintenance of said rail and said traction frame is essentially accomplished at ground level; and wherein said traction frame comprises a pair of longitudinal beams, a pair of cross members and a pair of axle assemblies; a pair of said at least one wheels and a pair of driving pinions being connected to said axle assemblies, a horizontal pin extending between said pair of longitudinal beams at 90° to the traction fame center line; and wherein said structural member is a box beam having a bracket extending therefrom, said bracket being in support engagement with said horizontal pin, and wherein said pin transfers tractive forces from said traction frame into said box beam and allows the traction frame to rotate in a vertical plane to keep each wheel in contact with said rail.

10. A method of driving a rotatable truss extending at least radially across a top of and extending laterally from an essentially above-ground circular tank having a cylindrical exterior tank wall and a circular tank bottom comprising:

providing a relatively-flat circular support base adjacently positioned at ground level exteriorly surrounding said tank wall adjacent the intersection of said tank wall and said tank bottom;

mounting a traction frame and traction wheel exteriorly of said tank wall to ride on said base;

mounting an end of said truss to said traction frame; and driving said traction frame and said traction wheel along said support base to rotate said truss.

11. The method of claim 10 further including mounting a rail on said support base encircling said circular tank and mounting said traction wheel to ride on said rail.

12. The method of claim 11 wherein said mounting of an end of said truss to said traction frame comprises pin-connecting a box beam to said traction frame and fixedly connecting said box beam to said truss.

* * * * *